No. 678,484.  
F. HART.  
MACHINE FOR CLEANING PRINTERS' ROLLERS.  
(Application filed Feb. 25, 1901.)  
(No Model.)  
Patented July 16, 1901.  
5 Sheets—Sheet 1.

No. 678,484. Patented July 16, 1901.
F. HART.
MACHINE FOR CLEANING PRINTERS' ROLLERS.
(Application filed Feb. 25, 1901.)
(No Model.) 5 Sheets—Sheet 2.

Witnesses
F. F. Schurzing
Henry L. Dick

F. Hart.
Inventor
By
Wilhelm Bonner.
Attorneys.

No. 678,484. Patented July 16, 1901.
F. HART.
MACHINE FOR CLEANING PRINTERS' ROLLERS.
(Application filed Feb. 25, 1901.)
(No Model.) 5 Sheets—Sheet 3.

Witnesses.
F. F. Schuyinger
Henry L. Deck

F. Hart, Inventor
By Wilhelm Bonner
Attorneys.

No. 678,484. Patented July 16, 1901.
F. HART.
MACHINE FOR CLEANING PRINTERS' ROLLERS.
(Application filed Feb. 25, 1901.)
(No Model.) 5 Sheets—Sheet 4.

Witnesses:
F. F. Schuster
Henry L. Deck

F. Hart Inventor
By Wilhelm & Bonner
Attorneys.

No. 678,484. Patented July 16, 1901.
F. HART.
MACHINE FOR CLEANING PRINTERS' ROLLERS.
(Application filed Feb. 25, 1901.)
(No Model.) 5 Sheets—Sheet 5.

Witnesses: F. Hart Inventor
By Wilhelm Bonner
Attorneys.

UNITED STATES PATENT OFFICE.

FREDERICK HART, OF POUGHKEEPSIE, NEW YORK, ASSIGNOR TO SAMUEL CRUMP MACHINE COMPANY, OF SAME PLACE.

MACHINE FOR CLEANING PRINTERS' ROLLERS.

SPECIFICATION forming part of Letters Patent No. 678,484, dated July 16, 1901.

Application filed February 25, 1901. Serial No. 48,851. (No model.)

*To all whom it may concern:*

Be it known that I, FREDERICK HART, a subject of the King of Great Britain, and a resident of Poughkeepsie, in the county of Dutchess and State of New York, have invented new and useful Improvements in Machines for Cleaning Printers' Rollers, of which the following is a specification.

This invention relates to a machine for cleaning printers' rollers by means of a suitable liquid or solvent.

The inking and distributing rollers of lithographic and typographic presses require to be frequently cleaned in order to remove the accumulations of ink, paper fiber, and other matter from the rollers and retain the surface of the rollers in good working condition. This cleaning is now universally done by hand, notwithstanding that several patents have been granted for machines designed to perform this work, and requires considerable time and attention, particularly in cleaning the rollers of lithographic presses, as the latter work with inks which cannot be easily removed from the rollers. These lithographic rollers require to be thoroughly cleaned, particularly in changing from one color to another, and the cleaning liquid must be of such a nature that it does not injure the rollers, the ink, or the printing-surface in case traces of the liquid should adhere to the rollers when the latter are put back in the press. For these reasons the cleaning of the rollers of lithographic presses is an operation which requires much time and labor. The cleaning liquids usually employed are turpentine for lithographic rollers and kerosene or crude petroleum, naphtha, or benzin for typographic rollers. These liquids are volatile and produce, when evaporated or atomized by agitation, a highly-inflammable vapor or atmosphere, which greatly increases the fire risk.

The object of this invention is to produce a simple and efficient machine which removes the ink and other adhering matters quickly and thoroughly from the roller under treatment, which applies the liquid solvent to the roller and removes the liquid therefrom in such a manner that the evaporation and atomization of the solvent are reduced to a minimum, which operates upon rollers of different diameters and lengths equally well, and which possesses other advantages.

My improved machine in its most complete form comprises, briefly stated, rollers upon which the printer's roller to be cleaned is supported horizontally, which propel the roller in the direction of its axis through the machine with a spiral movement, and which elevate the liquid solvent from a receptacle below and apply it to the roller under treatment, a series of wipers or scrapers past which the roller under treatment is propelled with a spiral movement and which remove the liquid and other matters in a thin film and without breaking up the liquid into fine particles or atomizing or evaporating the same, a pressure-roller which bears upon the roller under treatment and holds the same against the wipers or scrapers, a buff or brush wheel which operates upon the roller after the latter has passed the wipers or scrapers and which dries the roller by removing adhering traces of liquid and which also removes accidentally-adhering traces of ink and which puts the surface of the roller in proper condition for its work, and a delivery mechanism by which the cleaned roller is received and automatically discharged.

In the accompanying drawings, consisting of five sheets, Fig. 14 is a cross-section through the rear or delivery portion of the machine in line K K, Fig. 1, on the scale on which Fig. 11 is shown.

Like numerals of reference refer to like parts in the several figures.

The stationary main frame of the machine may be constructed in any suitable manner and consists, preferably, as shown, of a narrow front or receiving portion and a somewhat wider rear or delivery portion. These two portions of the frame comprise an upright front end frame 1, a wider upright middle frame 2, a rear end frame 3, a longitudinal top rod 4, arranged on the rear side of the machine and extending from the front frame 1 to the rear frame 3, a longitudinal top rod 5, arranged on the front side of the machine and extending from the front frame 1 to the middle frame 2, longitudinal top rods 6 and 7, arranged in the delivery portion of the machine and extending from the middle frame 2 to the rear frame 3, and bottom rods 8.

Figure 1:
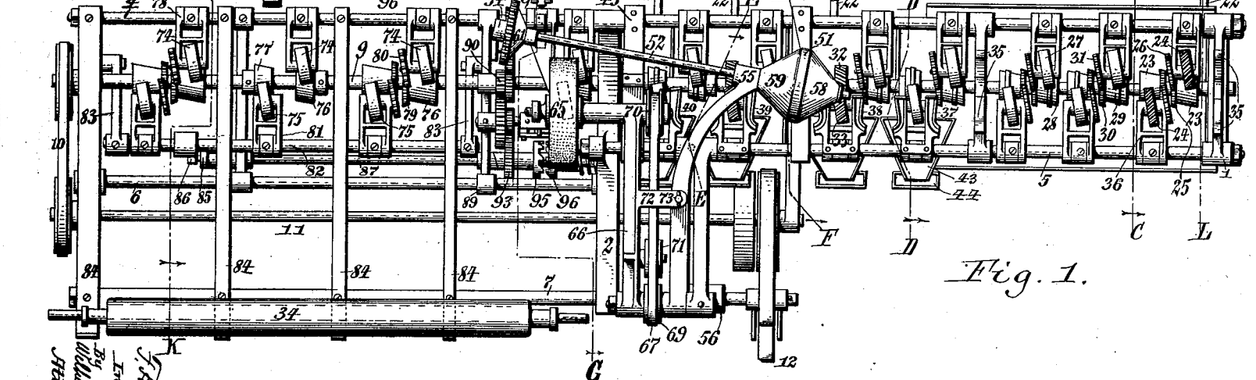
Figure 1 is a top plan view of my improved machine.
Figures 3, 4, 5, 6:
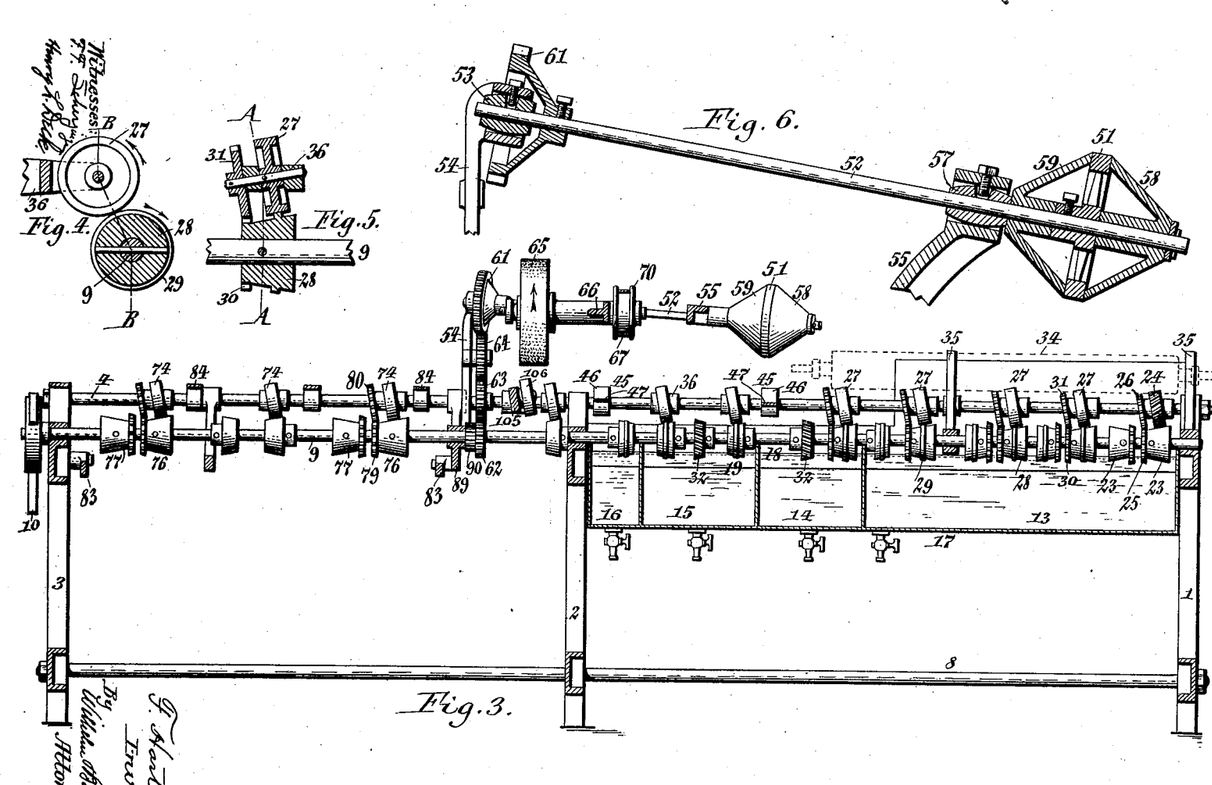
Fig. 3 is a sectional longitudinal elevation taken centrally through the machine.
Fig. 4 is a vertical cross-section, on an enlarged scale, of one of the feed-rollers and its driving-roller, the section being taken in line A A, Fig. 5.
Fig. 5 is a longitudinal section of the same rollers in line B B, Fig. 4.
Fig. 6 is a horizontal section, on an enlarged scale, of the pressure-roller and connecting parts.

9 is the horizontal main shaft of the machine, which extends lengthwise through the upper portion of the machine and is journaled in the upright frames 1, 2, and 3. This shaft is driven in any suitable manner, preferably, as shown in Figs. 1 and 3, by a belt 10 from a driving-shaft 11, arranged in the lower portion of the delivery portion of the machine. This driving-shaft is driven by a belt 12 or any other suitable mechanism.

Figure 2:
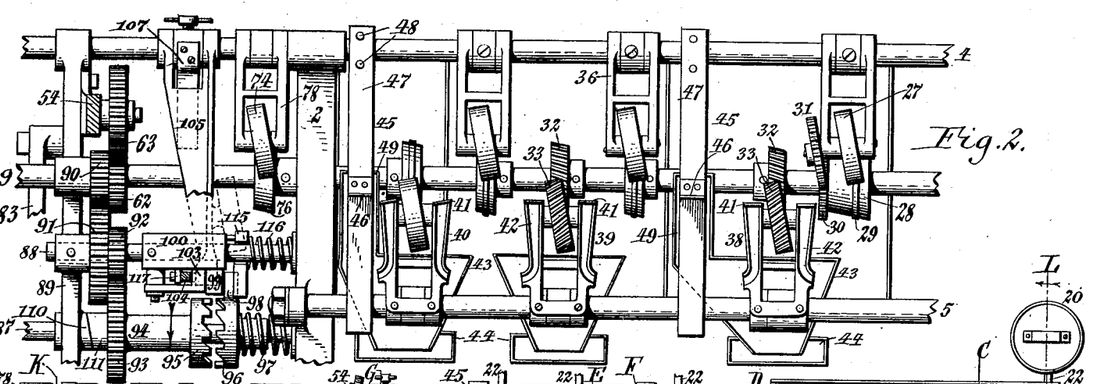
Fig. 2 is a top plan view, on an enlarged scale, of the middle portion of the machine, showing some of the wipers or scrapers and the front part of the automatic delivery mechanism.
Figure 7:
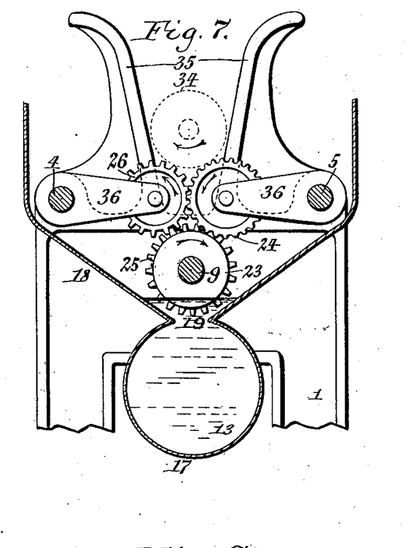
Figs. 7, 8, 9, and 10 are cross-sections through the front and middle portions of the machine, on an enlarged scale, in lines C C, D D, E E, and F F, Fig. 1, respectively.
Figure 8:
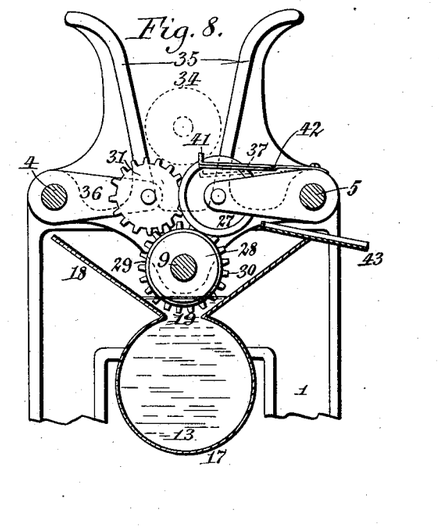
Figure 9:
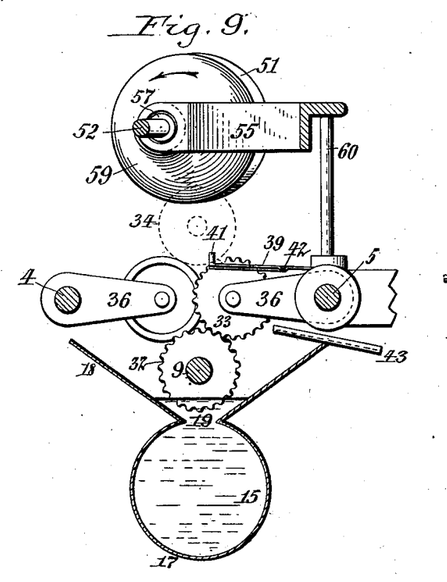
Figure 10:
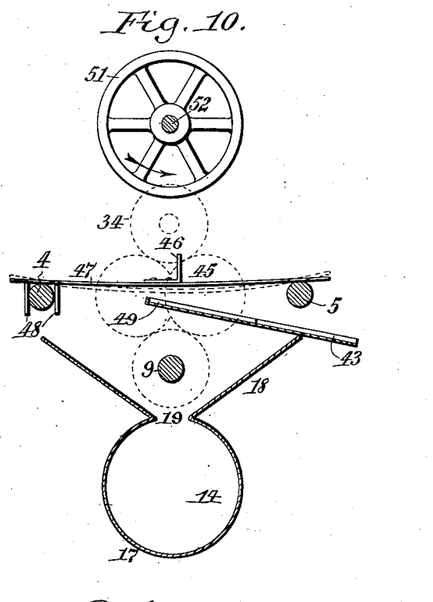
Figure 15:
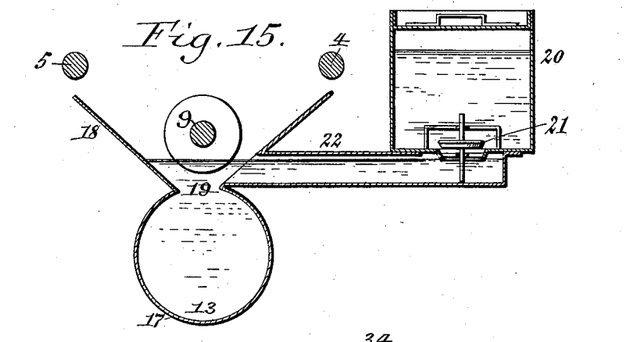
Fig. 15 is a vertical cross-section through one of the liquid-receptacles and the reservoir connected therewith in line L L, Fig. 1.

13, 14, 15, and 16 are open-topped liquid receptacles or troughs arranged lengthwise, one behind the other, in the receiving portion of the frame underneath the main shaft 9. Each of these receptacles is composed of a lower portion 17, which is preferably cylindrical in form, and a trough-shaped upper portion 18, which is mounted on the lower portion and communicates therewith by a longitudinal slot or contracted throat 19. Each of these receptacles is supplied with a suitable liquid or solvent in such a way that the level of the liquid is maintained somewhat above the throat of the receptacle, as indicated in Figs. 7, 8, and 9. A convenient device for maintaining the liquid-level automatically at the desired point is an elevated reservoir 20, of the well-known type, which is used as the oil-reservoir of students' lamps and which is provided in its bottom with a valve 21. This reservoir communicates with the receptacle above the throat by a horizontal pipe 22, as shown in Figs. 1 and 15. The main shaft 9 is provided above these liquid-receptacles with rollers, which dip into the liquid in the upper portion of the receptacles and elevate and transfer it to the feed-rollers which run in contact with the printer's roller to be cleaned and apply the liquid to the same. These rollers may be of various constructions, some of which are indicated in the drawings. For instance, as shown in Figs. 1, 3, and 7, a tapering driving-roller 23, having a smooth or plain face, may be secured to the main shaft 9 and run in contact with an upper toothed or ribbed feed-roller 24. The plain roller is provided with a gear-wheel 25 and the ribbed roller with a gear-wheel 26, meshing therewith, whereby the upper ribbed roller is driven from the lower roller. As shown in Figs. 1, 3, 4, 5, and 8, the upper feed-roller may be a plain-faced roller 27, and the lower driving-roller 28 may have its plain face provided with a raised portion 29, which runs in contact with the upper roller. The lower roller drives the upper roller by means of gear-wheels 30 and 31. The raised portion 29 of the lower roller makes contact with the upper roller and holds the depressed portion of the face of the lower roller out of contact, leaving a shallow space for elevating the liquid in a thin film to the upper roller. If the lower roller had an equal bearing along the face of the upper roller, the liquid would be squeezed off the lower roller and but little would be transferred to the upper roller. The raised portion 29 is shown somewhat enlarged in Figs. 4, 5, and 8 in order to show it more clearly. A slight difference in the projection of the parts of the face of the lower roller is sufficient for the purpose, or, as shown in Figs. 1, 2, and 9, the lower driving-roller 32, which is mounted on the main shaft 9, and the upper feed-roller 33 may be provided with spiral teeth or ribs, which mesh with each other and by which the upper roller is driven from the lower roller. These ribs or teeth afford ample spaces for elevating the cleaning liquid and cause the same to be transferred from the lower to the upper roller, and they also keep themselves clean.

The feed-rollers are arranged on opposite sides of the longitudinal center line of the machine or on opposite sides of a vertical plane laid lengthwise through the main shaft 9 for the purpose of supporting upon and between them the printer's roller 34, which is to be cleaned. This roller is shown in dotted lines in Figs. 3, 8, 9, 10, 11, 14, and 16 and in full lines on the delivery side of the machine in Figs. 1 and 14. These feed-rollers have their axes arranged lengthwise of the main driving-shaft, but at a slight obliquity or angle thereto or to the axis of the printer's roller in such a direction that by their rotation they rotate the printer's roller resting upon them and at the same time propel this roller with a spiral movement in the direction of its axis through the machine.

35 represents pairs of upwardly-projecting guide jaws or horns which are arranged at suitable distances apart in the receiving portion of the machine for the purpose of guiding the printer's roller down upon the feed-rollers. The latter are journaled in arms 36, which are hung loosely upon the longitudinal top bars 4 and 5, so that these rollers rest by gravity upon the lower driving-rollers. Any desired number of pairs of these liquid driving and feed rollers may be arranged in the machine, depending somewhat upon the length of the printers' rollers which are to be cleaned. The lower driving-rollers are made tapering to correspond to the obliquity of the upper or feed rollers. As shown in Fig. 2, the lower roller 32 gears with the upper roller 33 by spiral teeth. The upper rollers may also be driven by simple contact with the plain-faced lower rollers.

The feed-rollers support the printer's roller horizontally and propel the latter forwardly through the machine and also work the cleaning liquid or solvent thoroughly into the coating of ink on the printer's roller, and so loosen this layer and prepare it for removal. The ribbed feed-rollers are particularly efficient in propelling and rotating the printer's roller, as they penetrate the coating of ink and take hold of the surface of the leather or composition of which the roller is constructed. The cleaning liquid or solvent is applied by the lower rollers to the upper or feed rollers and by the latter to the printers' rollers in a comparatively thin film, so that the desired effect of loosening the ink on the printer's roller is produced by a very small expenditure of liquid or solvent.

The rapid rotation of the oblique feed-rollers imparts a correspondingly rapid spiral or screw-like movement to the printer's roller under treatment and drives the latter through the machine with a movement the spiral of which is very flat, so that the roller makes a large number of revolutions in passing through the machine.

Any ink which is worked off the printer's roller by the feed-rollers over the foremost receptacle 13 settles in the lower cylindrical part thereof. The lower part of each receptacle is protected against agitation by the narrow throat, as the rollers rotate above the throat and leave the liquid in the lower part of the receptacle comparatively undisturbed. The sediment is withdrawn from the receptacles from time to time.

37, 38, 39, and 40 are wipers, scrapers, or cleaning devices which are arranged over the rear part of the receptacle 13 and the receptacles 14, 15, and 16. These wipers are arranged in pairs on opposite sides of a pair of driving and feed rollers and engage against the under side of the printer's roller as it moves spirally past these wipers. The latter are constructed of any suitable material—for instance, metal or leather—and of any form which will cause the removal of the layer of liquid and solid matter from the printer's roller in a film or thin sheet and without breaking up, dispersing, or atomizing the liquid to any great extent. As shown in the drawings, particularly Figs. 1, 2, 8, and 9, these wipers are constructed of bifurcated plates of spring metal having at their inner ends upturned wiping edges 41, by which they bear against the printer's roller. These wipers or scrapers are sufficiently flexible or elastic to yield under the weight of the printer's roller, so that the wipers are thereby held in close contact with the surface of the roller. The shank or plate of each wiper is provided with a depressed channel 42, which leads outwardly from the wiping edge and discharges on one side into a pan 43, arranged below the wipers and discharging in turn into a receptacle 44. The liquid which is removed by the wiping edge 41 from the printer's roller and which carries the removed ink and other matter flows through the channel 42 into the pan 43 and is received in the receptacle 44, in which the separation of the solid matter from the solvent is effected by gravity, aided, if desired, by treatment with a mild alkali. The edges 41 of these wipers may be either parallel with the main shaft or at the same slight angle thereto at which the feed-rollers are arranged, as shown in Fig. 2. The foremost pair of wipers remove more of the liquid and impurities than any of the successive wipers, so that the liquid discharged by successive wipers becomes gradually less dirty. The different grades of liquids removed and discharged by these successive wipers are preferably collected in separate receptacles 44, as indicated in the drawings, so that each grade can be separately treated for separating the impurities therefrom. It is also desirable to supply the feed-rollers which are arranged near successive wipers with liquid from separate receptacles, so that the liquid from each pair of wipers can be separately manipulated and controlled. For these reasons separate receptacles 13, 14, 15, and 16 are shown; but it is obvious that a single receptacle might be used. Each of these separate receptacles is supplied with liquid automatically in the manner hereinbefore described.

Different kinds of liquid may be used in the different receptacles 13, 14, 15, and 16—for instance, kerosene, naphtha, benzin, &c.

In some cases it is desirable to use, in addition to the wipers already described, somewhat stiffer wipers or scrapers, such as the wipers 45. (Shown in Figs. 1, 2, 3, and 10.) Two or more of these wipers may be used at suitable intervals between the pairs of twin scrapers already described. These wipers 45 consist of upright blades 46, which bear against the under side of the printer's roller, and are secured to a transverse yielding or spring bar 47, which rests upon the top rods 4 and 5 of the frame. These spring-bars are preferably held in position at one end by pins 48, Fig. 10, engaging against one of the top rods, and rest loosely on the other top rod. The wiping-blades of these wipers are preferably arranged lengthwise of the main shaft, as shown. The liquid which is removed by these wipers 45 is preferably discharged into an extension 49 of the adjacent pan 43, Fig. 2.

Figure 16:
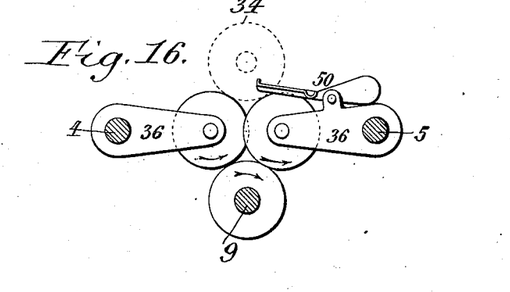
Fig. 16 is a transverse vertical section illustrating a modified construction of the wiper or scraper.

Instead of mounting or forming the wiping edges or blades on a spring arm, bar, or plate they may be mounted or formed, as shown in Fig. 16, on a weighted pivoted arm 50.

The wiping edges or blades are arranged at the line where the printer's roller bears against the feed-rollers and project upwardly slightly beyond the feed-rollers, so that when the printer's roller reaches a scraper the latter is depressed until the printer's roller rests firmly on the feed-roller. This arrangement of the supporting, propelling, and wiping devices enables the machine to operate upon printers' rollers of various diameters without requiring any adjustment or change in the parts of the machine for the purpose. Printers' rollers are usually two, three, or four inches in diameter, although larger and smaller sizes occur occasionally, and all of these sizes can be successfully treated by this machine.

The wipers or scrapers remove the liquid from the roller in a film or thin sheet and do not disperse, break up, or atomize the liquid to any great extent. The liquids used for this purpose—such as turpentine, kerosene, naphtha, benzin, &c.—are volatile, and if atomized by agitation, dispersed, or evaporated become diffused in the surrounding atmosphere, rendering the same highly inflammable. This objectionable result is avoided in this machine.

The wipers bear upwardly against the under side of the printer's roller, which is moving spirally over the same, and tend to lift the roller from the feed-rollers, whereby the propulsion of the printer's roller by the feed-rollers is impaired, if it does not cease altogether. In order to counteract this lifting tendency of the wipers, a pressure-roller 51 is provided, which bears down upon the printer's roller over the wipers and holds the roller down against the same. This pressure-roller is secured to the front end of an oblique shaft 52, Figs. 1, 3, and 6. This shaft is journaled at its rear end in a swiveled bearing 53, mounted in a standard 54 on the rear side of the main frame in such a way that the front end of the shaft can rise and fall freely as the pressure-roller accommodates itself to the position and size of the printer's roller. The shaft is journaled near its front end in the free rear end of an arm 55, which is pivoted at its front end on a horizontal rod 56 in such a way that the rear end of the arm can swing up and down. The free end of the arm is provided with a swiveled bearing 57, in which the shaft is journaled. 58 and 59 are front and rear guide-cones mounted loosely on the shaft 52 on the front and rear sides of the pressure-roller 51. These cones are fitted with their base against the sides of the roller. The front cone allows of a gradual approach to the pressure-roller and the rear cone of a gradual recession therefrom. As the printer's roller approaches the pressure-roller in passing toward the wipers the printer's roller strikes with its front end the front guide-cone and lifts the shaft and pressure-roller by moving along the front guide-cone until the pressure-roller has been lifted upon the printer's roller and bears down upon the same. The overhanging weight of the pressure-roller and connecting parts holds the pressure-roller down upon the printer's roller and the latter down upon the wipers. As the pressure-roller is capable of vertical movement with its shaft and supporting-arm, it adapts itself readily to the diameter of the printer's roller which is being cleaned. As the rear end of the printer's roller passes beyond the pressure-roller and recedes therefrom the rear guide-cone descends gradually and allows the pressure-roller and connecting parts to descend gradually and without shock to their lowermost position. The downward movement of the pressure-roller is arrested in its lowermost position by a stop 60, Fig. 9, which is struck by the arm 55 and supports the same.

The pressure-roller is driven by any suitable mechanism in such a way that its peripheral speed is equal to the peripheral speed of the feed-rollers. The mechanism shown for this purpose in the drawings, Figs. 1, 3, and 6, consists of a cup-shaped gear-wheel 61, secured to the rear end of the shaft 52 and embracing the rear bearing of the shaft, a gear-wheel 62 on the main shaft 9, and idler-wheels 63 and 64, mounted on the standard 54. The teeth in the gear-wheel 61 on the shaft of the pressure-roller and on the idler-wheel 64, meshing therewith, are so shaped that these wheels remain in mesh in the various positions of the shaft of the pressure-roller.

The pressure-roller and its shaft are arranged obliquely to the main shaft 9 or to the axis of the printer's roller at the same angle at which the feed-rollers are arranged.

Figures 11, 12, 13:
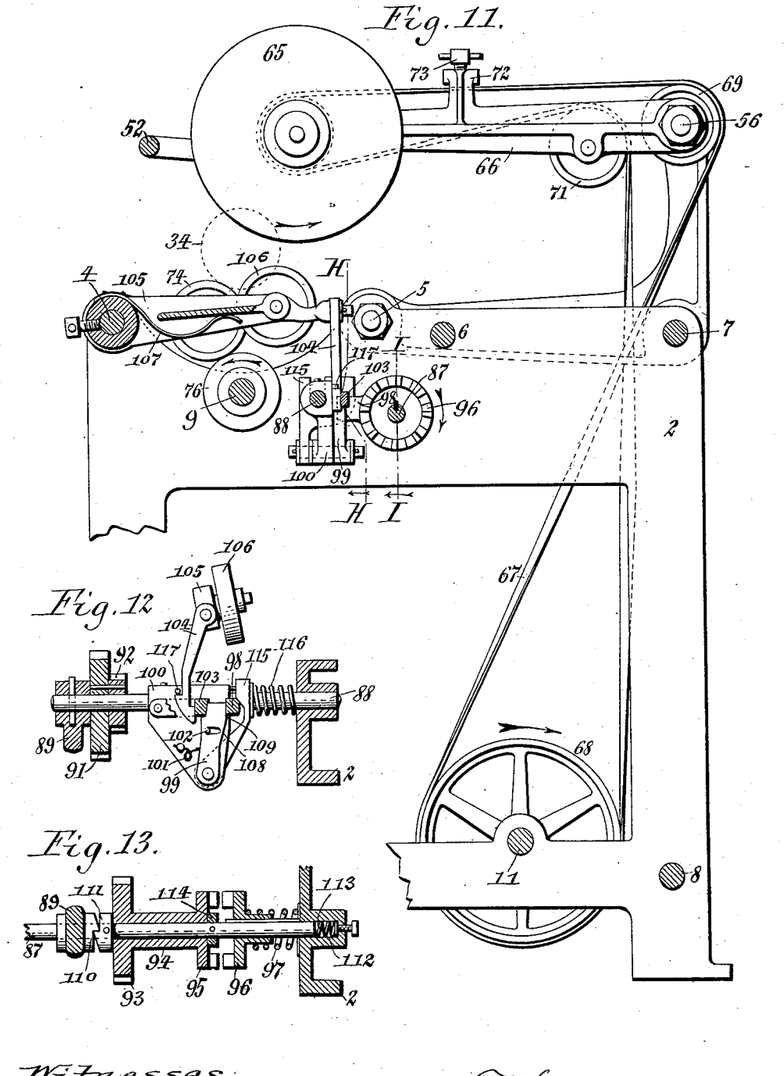
Fig. 11 is a transverse vertical section through the middle portion of the machine in line G G, Fig. 1.
Fig. 12 is a longitudinal sectional elevation of the automatic delivery mechanism in line H H, Fig. 11, viewed in the direction of the arrow in Fig. 11.
Fig. 13 is a similar longitudinal elevation in line I I, Fig. 11, viewed in the direction of the arrow in Fig. 11.

In order to remove from the printer's roller all traces of liquid and ink and also to put the surface of the roller in proper condition for its work, a buff or brush wheel 65 is arranged in rear of the last wiper. This wheel is journaled in the rear end of an arm 66, which is pivoted at its front end in line with the pivot of the arm 55 of the pressure-roller, Figs. 1 and 11. The working face of this buff or brush wheel is constructed of any suitable material which produces the desired wiping, brushing, or abrading effect. The wheel may be constructed, for instance, of disks of buff-cloth, secured side by side and is rotated by a belt 67 from a pulley 68 on the main driving-shaft 11. This belt runs around a guide-pulley 69 on the pivot of the arm 66, a pulley 70 on the wheel-spindle, and a pulley 71 on the arm near its pivot and is crossed between the guide-pulleys and the pulley 68 on the main driving-shaft, as shown in Fig. 11. The arm of the buff-wheel is provided with a laterally-projecting lug 72, which projects over the arm 55 of the pressure-roller, and is provided with a set-screw 73, by which it rests on the arm 55, so that when the latter is raised or lowered by a printer's roller, coming in contact with the pressure-roller and its guide-cone the buff-wheel follows this movement. By adjusting this set-screw the position of the face of the buff-wheel can be adjusted vertically with reference to the face of the pressure-roller for acting more or less intensely against the roller under treatment or for compensating for the wear of the buff-wheel.

Figure 14:
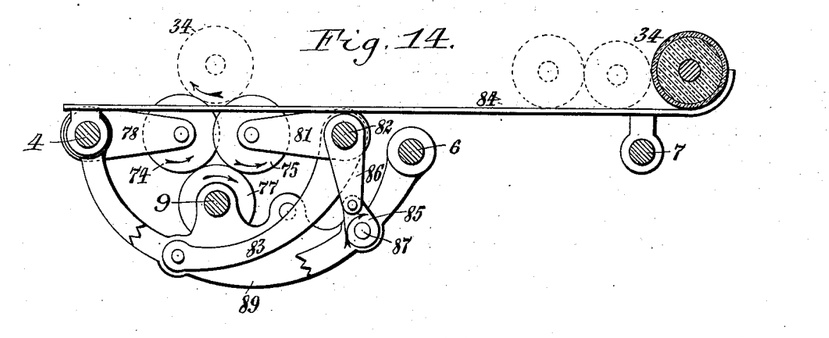

The rear portion of the machine beyond the buff-wheel is provided with a delivery apparatus, which receives the cleaned rollers and which automatically delivers each roller toward the front side of the machine and then returns to its normal position ready to receive the next following roller. This delivery apparatus is constructed as follows: 74 represents receiving-rollers, and 75 dumping-rollers, which are arranged above the main shaft 9 and on opposite sides thereof in the delivery portion of the machine and in line with the feed-rollers, so that the printer's roller as it is moved through the machine past the wipers and buff-wheel is delivered upon these rollers. The receiving-rollers are arranged on the rear side of the main shaft and the dumping-rollers on the front side, and these rollers are supported by tapering driving-rollers 76 77, secured to the main shaft. The receiving-rollers 74 are journaled obliquely in the free ends of arms 78, which are hung upon the top rod 4. These receiving-rollers rest upon the tapering rollers 76 and may be driven therefrom merely by contact or by gear-wheels 79 80. The dumping-rollers 75 rest upon the tapering rollers 77 and are journaled obliquely in arms 81, which are hung upon a rod 82. The latter is arranged lengthwise in the delivery portion of the machine and is mounted in the upper ends of arms 83, Figs. 1, 2, 3, and 14. These arms are pivoted at their lower ends, so that their upper ends can swing up and down and carry the dumping-rollers up and down on the driving-rollers 77. When these arms are in their elevated position, as shown in Fig. 14, the dumping-rollers stand at the same elevation as the receiving-rollers, and the printer's roller is supported upon and between these two sets of rollers. When the arms are lowered, the dumping-rollers roll down on the front side of their driving-rollers and are withdrawn below transverse receiving-bars 84. Upon so lowering the dumping-rollers the printer's roller rolls down upon the transverse bars, and as the latter are slightly inclined toward the front side of the machine the roller rolls upon these bars until it reaches the upturned front ends thereof or strikes against rollers resting on the front portions of these bars, as indicated in Fig. 14. The rollers are removed from the supporting-bars by the attendant. The up-and-down movement of the dumping-rollers is produced by a crank 85 and a link 86, which latter connects the crank to the rod 82, on which the dumping-rollers are mounted. The crank 85 is secured to the rear end of a shaft 87, which is rotated intermittently once for every roller which is received and dumped. The rotation of this shaft lowers the dumping-rollers after the printer's roller has been received upon the receiving and dumping rollers and raises the dumping-rollers to their normal position after the roller has been delivered. During the interval at which the shaft is stationary the dumping-rollers are held in their elevated position by the crank and link for receiving the next following cleaned roller. The periodical single rotation of this dumping-shaft is effected by the following mechanism, which is most clearly shown in Figs. 1, 2, 11, 12, and 13: 88 is a longitudinal rod which is arranged between the main shaft 9 and the dump-shaft 87 and secured at its front end to the middle frame 2 and at its rear end to a cross-piece 89. 90 is a gear-wheel secured to the main shaft 9 on the rear side of the gear-wheel 62, from which the pressure-roller is driven. This gear-wheel 90 meshes with a gear-wheel 91, which is mounted on the rear portion of the rod 88 and which carries on its front side a gear-wheel 92. The latter meshes with a gear-wheel 93, which is formed on the rear end of a sleeve 94, turning loosely on the dump-shaft 87 and carrying at its front end a clutch-disk 95. This clutch-disk is constantly rotated from the main shaft 9 by this train of gear-wheels. 96 is an opposing clutch-disk which is arranged on the front portion of the dump-shaft 87, so as to be capable of lengthwise movement thereon toward and from the clutch-disk 95. This clutch-disk 96 moves on a key in the dump-shaft, so that it rotates the dump-shaft when it is engaged with the rotating clutch-disk 95 and stops the rotation of the dump-shaft when it is disengaged from that clutch-disk. This keyed clutch-disk 96 is pressed toward the opposing clutch-disk by a spring 97, but is normally held out of engagement with the clutch-disk 95 by an ear 98, projecting laterally from the clutch-disk 96 and engaging against the front side of a pawl 99. The latter is connected at its lower end by a transverse pivot to a hanger 100, which is secured to the longitudinal rod 88. This pawl 99 is pressed forwardly by a spring 101, and its movement is limited by a stop-pin 102 engaging in a slot in the pawl. This pawl is locked in its forward position by a horizontal latch 103, which is pivoted at its rear end to the hanger 100 by a horizontal pivot, so that this latch can be swung up for releasing the pawl 99 and can be swung down for locking the pawl in its forward position. This latch is raised at the proper time by a hook 104, which is pivoted at its upper end to the free end of a transverse arm 105. The latter is mounted on the top rod 4 of the frame in such a way that its free end can swing up and down and is provided with a roller 106 in such a position that the front end of the printer's roller passing over this arm can strike this roller 106 and depress the same and the arm 105. The arm and the hook 104 are held in this depressed position while the printer's roller is moving over this arm, which is located underneath or near the buff-wheel, so that this roller 106 is cleared by the rear end of the printer's roller when the latter has about passed the buff-wheel. In the depressed position of the arm 105 the hook 104 stands below the latch 103 and engages under the same, and this latch engages against the upper end of the pawl 99, and the latter in turn engages against the ear 98 of the keyed clutch-disk 96 and holds this disk out of engagement with the rotating clutch-disk 95, as shown in Fig. 2. The latch 103, the pawl 99, and the ear 98 stand in the same position before the arm 105 is depressed by the printer's roller. In the elevated position of the arm, which is shown in Figs. 11 and 12, the hook has not yet engaged underneath the latch 103, but is ready to engage under the same as soon as the arm 105 is depressed by the printer's roller. As soon as the rear end of the printer's roller has cleared the roller 106 on the arm 105 the latter is raised by a spring 107. This upward movement of the arm and hook 104 raises the latch 103 out of engagement with the pawl 99, and the latter is pressed or swung forward by the ear 98 of the clutch-disk 96, which is pressed forward by the spring 97. The spring now throws the clutch-disk 96 into engagement with the rotating clutch-disk 95, whereby the clutch-disk 96 and the dump-shaft 87 are rotated. This rotation first causes the ear 98 to move upwardly away from the upper end of the pawl 99. As soon as the latch 103 has been raised by the hook 104 and the upper end of the pawl 99 is swung back by the rearward movement of the clutch-disk 96 the upper end of the pawl 99 strikes the nose of the hook 104 underneath the latch 103 and releases the hook from the latch, thereby making the latch ready to drop back as soon as the ear 98 has cleared the upper end of the pawl 99 and the latter has been swung forward by the spring 101. The ear 98 having cleared the pawl 99 at the beginning of the rotation of the clutch-disk 96, the pawl 99 is swung forward by the spring 101, and the latch 103 drops down and again locks the pawl in the position shown in Fig. 12. The clutch-disk 96 remains in engagement with the clutch-disk 95 and causes the dump-shaft 87 to rotate in the direction of the arrow, Fig. 2, thereby turning the shaft and the crank 85 in the direction of the arrow, Fig. 14. During the latter part of the rotation of the clutch-disk 96 the ear 98 strikes the incline 108 on the front side of the pawl 99, and as the latter is rigidly held in position this incline forces the clutch-disk 96 backward and finally disengages the same from the clutch-disk 95. This takes place when the dump-shaft 87 has completed a revolution. The shaft now remains stationary until a succeeding printer's roller acts upon the arm 105, when the operation is repeated. In order to hold the driven clutch-disk 96 positively out of engagement with the clutch-disk 95, the pawl 99 is provided above the incline 108 with a straight face 109, against which the ear 98 bears when the clutch-disks are disengaged, as shown in Fig. 12. In order that the two clutch-disks may remain in engagement while the ear 98 rides up on the incline 108 of the pawl 99 and the clutch-disk 96 is moved forwardly, the driving clutch-disk 95 and the dump-shaft 87 are caused to move lengthwise in the same direction and through the same distance by a cam 110, formed on the cross-piece 89, Figs. 2 and 13, and a corresponding cam-faced collar 111 on the dump-shaft. The end of the latter is arranged in a socket 112 in the middle frame 2 and compresses during this movement a spring 113 in said socket. When the ear 98 has passed upwardly beyond the incline 108 and has seated itself against the straight face 109, the cam-face of the collar 111 on the dump-shaft has passed beyond the abrupt face of the cam 110, whereby the shaft and the driving clutch-disk are released, so that the spring 113 now forces the dump-shaft back and the clutch-disk 95 out of engagement from the clutch-disk 96. The clutch-disk 95 and its sleeve 94 and gear-wheel 93 are free to turn on the dump-shaft, but are held against longitudinal movement on the same between the collar 111 and a collar 114 or by other means.

115 is a safety-stop which is pivoted at its lower end to the hanger 100 and which is backed by a spring 116. This stop prevents the ear 98 from passing beyond the straight face of the pawl 99 when the machine runs at an excessive speed.

The upward movement of the arm 105 is limited by the hook 104 striking a stop-pin 117 on the hanger 100.

It is obvious that the mechanical construction of the parts of this machine can be varied in various respects without materially changing the general organization and operation of the machine, and I therefore do not wish to limit myself to the mechanical details described and shown. The same are intended to illustrate the best embodiment of the invention known to me.

I claim as my invention—

1. The combination of means for propelling the printer's roller to be cleaned lengthwise of its axis with a spiral movement, means for applying a cleaning liquid to the roller, and a stationary wiper past which the roller is propelled and which impinges against the same and removes the liquid and other material from its surface, substantially as set forth.

2. The combination of rollers which support the printer's roller to be cleaned and propel the same lengthwise of its axis with a spiral movement, means for applying a cleaning liquid to the roller, and a stationary wiper arranged on one side of the path of the roller and impinging against the surface thereof as it is propelled past the wiper, substantially as set forth.

3. The combination of a cleaning device, and oblique feed-rollers which support the roller to be cleaned and propel the same past said device with a spiral movement, substantially as set forth.

4. The combination of a cleaning device, oblique feed-rollers which support the roller to be cleaned and propel the same past said device with a spiral movement, and means for applying a cleaning liquid to the roller, substantially as set forth.

5. The combination of a cleaning device, oblique feed-rollers which support the roller to be cleaned and propel the same past said device, a receptacle for the cleaning liquid arranged below said feed-rollers, and means for elevating the liquid from the receptacle to the roller to be cleaned, substantially as set forth.

6. The combination of a cleaning device, feed-rollers which support the roller to be cleaned and propel the same past said device, a receptacle for the cleaning liquid arranged below said rollers and means for elevating the liquid from the receptacle to the feed-rollers, substantially as set forth.

7. The combination of an open-topped receptacle for the cleaning liquid, oblique feed-rollers arranged above said receptacle, means for elevating the liquid to said feed-rollers, and a cleaning device past which the roller to be cleaned is propelled by the feed-rollers after the liquid has been applied to said roller, substantially as set forth.

8. The combination of a liquid-receptacle composed of a lower portion and an open-topped upper portion connected by a contracted throat, driving-rollers which dip into the liquid in the upper portion of the receptacle, feed-rollers which run in contact with said driving-rollers, and a cleaning device, substantially as set forth.

9. The combination of an open-topped liquid-receptacle, driving-rollers which dip into the liquid in the same and which have their faces constructed with a raised portion, feed-rollers which run in contact with the raised portion of the driving-rollers, and a cleaning device, substantially as set forth.

10. The combination of a receptacle for the cleaning liquid, a roller feed mechanism arranged above the same, receiving the liquid therefrom and applying it to the roller to be cleaned, and a cleaning device past which the roller is moved after the liquid has been applied to the same, substantially as set forth.

11. The combination of a receptacle for the cleaning liquid, a roller feed mechanism arranged above the same, receiving the liquid therefrom and applying it to the roller to be cleaned, a cleaning device past which the roller is moved after the liquid has been applied to the same, and means for collecting the liquid which is removed by the cleaning device and discharging it outside said receptacle, substantially as set forth.

12. The combination of a receptacle for the cleaning liquid, a roller feed mechanism arranged above the same, receiving the liquid therefrom and applying it to the roller to be cleaned, successive cleaning devices arranged in rear of the receptacle, and individual collecting devices whereby the different grades of liquid removed by different cleaning devices are separately collected, substantially as set forth.

13. The combination of a cleaning device, a receptacle for the cleaning liquid, a shaft arranged lengthwise over said receptacle and provided with rollers which dip into the liquid in the same, feed-rollers arranged above said dipping rollers and running in contact therewith, and a conductor which receives the liquid removed by the cleaning device and prevents the same from returning to said receptacle, substantially as set forth.

14. The combination of a cleaning device, a receptacle for the cleaning liquid, a shaft arranged lengthwise over said receptacle and provided with tapering rollers which dip into the liquid in the same, and oblique feed-rollers for the roller to be cleaned running in contact with said dipping rollers, substantially as set forth.

15. The combination of a cleaning device, oblique-toothed feed-rollers for supporting and propelling the roller to be cleaned, and means for supplying a cleaning liquid to the roller, substantially as set forth.

16. The combination of a cleaning device, a pressure device arranged above said device and holding the roller to be cleaned against the same, and means for propelling the roller with a spiral movement past the cleaning device, substantially as set forth.

17. The combination of a cleaning device, a pressure-roller arranged above the same, means for rotating the pressure-roller, and means for propelling the roller to be cleaned with a spiral movement past the cleaning device, substantially as set forth.

18. The combination of a cleaning device, a vertically-movable pressure-roller arranged above the same, and means for propelling the roller to be cleaned with a spiral movement past the cleaning device, substantially as set forth.

19. The combination of a cleaning device, a pressure-roller arranged above the same, a vertically-movable shaft on which said roller is mounted, means for rotating said shaft, and means for propelling the roller to be cleaned with a spiral movement past the cleaning device, substantially as set forth.

20. The combination of a cleaning device, a pressure-roller arranged above the same, a vertically-movable shaft to which said roller is secured, means for rotating said shaft, guide-cones arranged on the front and rear sides of said pressure-roller, and means for propelling the roller to be cleaned with a spiral movement past the cleaning device, substantially as set forth.

21. The combination of a cleaning device, oblique feed-rollers for propelling the roller to be cleaned with a spiral movement past said device, and a pressure-roller arranged obliquely above the same, substantially as set forth.

22. The combination of oblique feed-rollers for propelling the roller to be cleaned with a spiral movement in the direction of its axis, and a stationary cleaning device arranged in line with the face of one of said feed-rollers, substantially as set forth.

23. The combination of a cleaning device, oblique feed-rollers, a pressure-roller arranged above said device, an oblique shaft carrying said pressure-roller at its front end, a vertically-movable support in which the front portion of said shaft is journaled, and a driving mechanism applied to the rear portion of said shaft, substantially as set forth.

24. The combination of means for propelling the printer's roller to be cleaned lengthwise of its axis with a spiral movement, means for applying a cleaning liquid to the roller, and a stationary yielding wiper arranged on one side of the path of the roller and having a wiping edge which impinges against the surface of the roller as the latter is propelled past the wiper, substantially as set forth.

25. The combination of a roller feed mechanism, means for applying a cleaning liquid to the roller, and a stationary yielding wiper having a wiping edge which bears against the roller and having outside of its wiping edge a conductor for collecting the liquid from the edge and discharging such liquid, substantially as set forth.

26. The combination of a roller feed mechanism, means for applying a cleaning liquid to the roller, and a stationary wiper composed of an elastic bar supported at both ends and provided between its ends with an upwardly-projecting wiping-blade, substantially as set forth.

27. The combination of a cleaning device, a feed mechanism for propelling the roller to be cleaned with a spiral movement past the same, means for applying a cleaning liquid, and a buff-wheel which operates upon the roller to be cleaned in rear of said cleaning device, substantially as set forth.

28. The combination of a cleaning device, a pressure device arranged above the same, a feed mechanism for propelling the roller to be cleaned with a spiral movement past the cleaning device, means for applying a cleaning liquid, and a buff device which operates upon the roller to be cleaned in rear of said cleaning device, substantially as set forth.

29. The combination of a cleaning device, a vertically-movable pressure device arranged above the same, a buff device arranged in rear of the cleaning device and capable of vertical movement with the pressure device, a feed mechanism for propelling the roller to be cleaned with a spiral movement past the cleaning device, and means for applying a cleaning liquid, substantially as set forth.

30. The combination of a cleaning device, a feed mechanism for propelling the roller to be cleaned with a spiral movement past the same, means for applying a cleaning liquid, a pressure-roller arranged above the cleaning device and mounted on a vertically-movable support, and a buff-wheel supported on the support of the said pressure-roller and capable of vertical movement therewith, substantially as set forth.

31. The combination of a cleaning device, a feed mechanism for propelling the roller to be cleaned with a spiral movement past the same, means for applying a cleaning liquid, a pressure-roller arranged above the cleaning device and mounted on a vertically-movable support, a buff-wheel arranged in rear of said cleaning device, and an adjusting device whereby the buff-wheel is supported on the support of the said pressure-roller, substantially as set forth.

32. The combination of a receptacle for the cleaning liquid, a roller feed mechanism arranged above the receptacle, receiving the liquid therefrom and applying it to the roller to be cleaned, a cleaning device, a pressure-roller arranged above the same, and a buff-wheel arranged in rear of said cleaning device, substantially as set forth.

33. The combination of means for propelling the roller to be cleaned lengthwise of its axis with a spiral movement, means for applying a cleaning liquid, a stationary wiper past which the roller is propelled, and a receiving device arranged in rear of the wiper and provided with an automatic mechanism for discharging the cleaned roller, substantially as set forth.

34. The combination of a cleaning device, a feed mechanism which propels the roller to be cleaned lengthwise past the same, means for applying a cleaning liquid, receiving and dumping rollers arranged in rear of the cleaning device, and means for automatically operating the dumping-rollers, thereby discharging the cleaned roller, substantially as set forth.

35. The combination of a cleaning device, a feed mechanism which propels the roller to be cleaned lengthwise past the same, means for applying a cleaning liquid, receiving and dumping rollers arranged in rear of the cleaning device, a dumping-shaft, means for raising and lowering the dumping-rollers from said shaft, a clutch for driving said shaft, and automatic mechanism whereby the clutch is thrown into gear after a cleaned roller has been received and out of gear when such roller has been discharged, substantially as set forth.

36. The combination of a cleaning device, a feed mechanism which propels the roller to be cleaned lengthwise past the same, means for applying a cleaning liquid, receiving-rollers, dumping-rollers hung to a vertically-movable bar, a dumping-shaft provided with a crank, a link connecting said crank with said bar, a clutch for driving said shaft, and automatic mechanism whereby the clutch is thrown into gear after a cleaned roller has been received and out of gear when such roller has been discharged, substantially as set forth.

Witness my hand this 20th day of February, 1901.

FREDERICK HART.

Witnesses:
W. FORWARD,
F. E. HART.